United States Patent [19]

Ohara et al.

[11] 3,953,369

[45] *Apr. 27, 1976

[54] METHOD FOR THE PRODUCTION OF A PLATINUM CATALYST USED FOR PURIFICATION OF EXHAUST AND WASTE GASES

[75] Inventors: Takashi Ohara, Nishinomiya; Tetsuji Ono, Amagasaki; Shoichi Ichihara, Toyonaka; Koichi Saito, Suita, all of Japan

[73] Assignee: Nippon Shokubai Kagaku Kogyo Co., Ltd., Osaka, Japan

[ * ] Notice: The portion of the term of this patent subsequent to July 29, 1992, has been disclaimed.

[22] Filed: Apr. 2, 1974

[21] Appl. No.: 457,209

[30] Foreign Application Priority Data

Apr. 6, 1973  Japan.............................. 48-38643

[52] U.S. Cl............................. 252/472; 252/466 PT
[51] Int. Cl.².................... B01J 23/40; B01J 23/42
[58] Field of Search............... 252/466 PT, 472, 460

[56] References Cited

UNITED STATES PATENTS

| | | | |
|---|---|---|---|
| 3,785,998 | 1/1974 | Hoekstra.......................... | 252/472 X |
| 3,816,344 | 6/1974 | Shimizu et al. ............... | 252/466 PT |

*Primary Examiner*—W. J. Shine
*Attorney, Agent, or Firm*—Armstrong, Nikaido & Wegner

[57] ABSTRACT

A method for the production of a platinum catalyst used for purification of exhaust and waste gases which comprises supporting platinum either alone or in combination of other noble metals on to a porous inorganic refractory support using an aqueous medium containing dinitrodiamine platinum and, optionally, other noble metals or their compounds in the presence of a poly(oxyethylene) type nonionic surface active agent of an average molecular weight of at least 500 and subjecting the so treated support to activation by calcining in an oxidative atmosphere or by reducing in a reductive atmosphere.

17 Claims, 6 Drawing Figures

PRIOR ART

FIG. 6

PRIOR ART

METHOD FOR THE PRODUCTION OF A PLATINUM CATALYST USED FOR PURIFICATION OF EXHAUST AND WASTE GASES

The present invention relates to a method for the production of a supported platinum catalyst used for purification of exhaust and waste gases and, particularly, to a method for the production of a catalyst comprising a platinum containing catalyst composition supported on a porous inorganic refractory support used for complete oxidation of carbon monoxide and hydrocarbons contained in an internal combustion engine exhaust gases and industrial plant waste gases. It concerns, more particularly, with a method for the production of a platinum containing catalyst used for purification of exhaust and waste gases having excellent purifying activity, especially a high activity in a low temperature range in spite of its low supported amount of a catalyst composition by using dinitrodiamine platinum as a platinum compound and adding a specific additive into an aqueous solution or medium of a catalyst composition, and supporting the platinum containing catalyst composition on to a surface layer of a support with a high density.

Platinum, palladium, rhodium and like metals belonging to the platinum group in the Periodic Table have for a long time been known to be of an extremely high activity as catalytic substances and, in virtue of the high activity as catalyst, occupy a very important position as industrial oxidation, petroleum reforming and hydrogenation catalysts in spite of their expensiveness. Recently, catalysts containing platinum either alone or in combination with other platinum group metals are highlighted especially as a catalyst for purification of automobile exhaust gases and industrial plant waste gases because of high activities and no fear of such a secondary pollution caused by scattering of catalytic substances as it is said to be usual in the case of heavy metal catalysts.

With approach of the date of enhancement of a law for regulation of public pollution by automobile exhaust gases, so called the Masky law, a variety of improvements in automobile engine have been made and the concentration of incomplete combustion product in exhaust gas from a recent improved internal combustion engine is remarkably lower than that in exhaust gas from an old one. However, it is necessary for catalytic purification of such a low emission exhaust gas to employ a catalyst having a higher activity and being active at a lower temperature range than a catalyst used to purify a high emission exhaust gas. Also, in case of purification of industrial plant waste gases, there is an increasing demand for a catalyst exhibiting a high activity at a lower temperature range as possible because the recent abrupt rise of prices of appliances and apparatus causes an abrupt increase in ratio of the price of a heat exchanger in the total price of a waste gas purifying equipment and this necessitates to use a heat exchanger of as a small size as possible. Namely, there is an increasing demand for a supported platinum catalyst as a catalyst for purifying automobile exhaust gases and industrial plant waste gases, especially those having a high catalytic activity in a low temperature range in spite of a low supported amount of a catalyst composition.

Thus, it is a usual way for developing a high activity with a small quantity of such a noble metal to support, on use of such an expensive noble metal as a catalyst, on to a support having a higher surface area and, in addition, it will be expected that a high catalytic activity is exhibited using a lesser quantity of a noble metal by dispersing the noble metal only on the surface layer of a support since a catalytic reaction mainly takes place on the external surface of a catalyst.

Some methods for the production of supported noble metal catalysts have already been developed on the basis of such an idea and, for instance, in Japanese patent publication No. 11093/1968 there is disclosed a method for the production of catalyst by impregnating a support with a chloroplatinate solution and calcining the so impregnated support in which the chloroplatinate solution is added with a thiocarboxylic acid, such as thiomalic acid or thioglycolic acid, to prevent the platinum compound penetrating into the inside of the support thereby to enhance the catalytic activity of the catalyst obtained. However, there is a doubt about the effect of enhancing the catalytic activity by depositing platinum only on to the surface layer of a support in accordance with the aforesaid method since, as indicated by examples in the above specification, some of the catalysts prepared in the aforesaid method are inferior in initial activity for oxidation of both carbon monoxide and hydrocarbons to one prepared without using thiocarboxylic acid.

In Japanese patent publication No. 25369/1971, there is disclosed a method for supporting a noble metal in a high concentration on to the external surface of a support by impregnating a support with a solution of a noble metal compound containing an alcohol. However, disadvantageously from an economical point of view, in this method an alcohol is used in a strength of 50 to 100% by weight making the method expensive and the method needs a step of collecting evaporated alcohol since the alcohol inevitably evaporates during the immersion of a support in the alcoholic solution to pollute air. And, there is a danger of explosion or fire on burning of the alcohol. In Japanese patent publication No. 35670/1962, there is disclosed a method for supporting palladium on to the surface of a support by adding an alkali carbonate, such as sodium or potassium carbonate, to an acidic aqueous solution of a palladium salt for adjusting the pH of the solution to 2.0 to 4.8. However, this method also is unsatisfactory since an alkali metal, such as sodium or potassium, incorporated in the finished catalyst lowers the catalytic activity of the catalyst.

Thus, the platinum supported catalyst prepared by such method has low supported amount and relatively higher standard as a catalyst activity but the activity as a lower temperature range is insufficient, so it cannot be used practically for purification of the aforesaid low concentration emission.

Accordingly, an object of the present invention is to provide an improved method for preparing a platinum supporting catalyst.

Another object of the present invention is to provide a method for the production of a supported platinum catalyst for purification of exhaust and waste gases having a high activity at a lower temperature range.

A further object of the present invention is to provide a method for the production of a supported platinum catalyst having a low supported amount and providing a high durability which can be easily prepared in an industrial scale.

In accordance with a method of the present invention, a supported platinum catalyst for purification of exhaust and waste gases is prepared by supporting a catalyst composition on to a porous inorganic refractory support from an aqueous dispersion or solution of dinitroditiamine platinum in the presence of a poly(oxyethylene) type nonionic surface active agent having an average molecular weight of at least 500 and subjecting the so treated support to activation.

In the known methods for the production of catalysts for purification of internal combustion engine exhaust gases and industrial plant waste gases as disclosed in literatures, as the platinum compound as a raw material of catalyst mainly used is chloroplatinic acid $H_2PtCl_6$ and, in addition, platinum chlorides $PtCl_2$, $PtCl_4$ and $PtCl_6$, ammonium chloroplatinate $(NH_4)_2PtCl_6$ and like chlorine-containing platinum compounds have been used.

However, use of such chlorine-containing platinum compounds as a starting material for the preparation of a catalyst for purification of exhaust gases results in a finished catalyst which is very insufficient in activity in a low temperature range, whereas a high low-temperature activity is required recently for such a catalyst.

We have now found that all the supported platinum catalysts prepared using a chloroplatinic acid or like chlorine-containing platinum compound or other platinum compound as a starting material other than dinitrodiamine platinum are, when used for treatment of automobile exhaust gases or industrial plant waste gases after reduction by means of hydrogen or calcination in air, very insufficient in activity in a low temperature range for complete oxidation of carbon monoxide and hydrocarbons. We have found that, on the contrary, a catalyst having a very high activity in a low temperature range is obtained by using as a starting material dinitrodiamine platinum because of the compound being easily decomposed by reduction or calcination at a relatively low temperature to form a finely dispersed supported platinum retaining its inherent high activity without remaining any impurity which would have adverse effect on the catalytic activity of the finished catalyst as a catalyst for purification of exhaust gases.

The present invention will be readily understood from the following description, when read together with the accompanying drawings, wherein.

Dinitrodiamine platinum $Pt(NO_2)_2(NH_3)_2$ used in the method of the present invention as a starting material may easily be synthesised in various processes. For example, dinitrodiamine platinum is easily obtained as a precipitate in the process as described by Georg Brauer in "Handbook of Preparative Inorganic Chemistry," Academic Press, Inc., vol. 2, pp 1579–80, through the reactions as indicated by the following equations, $$K_2PtCl_6 + 6NaNO_2 \rightarrow K_2Pt(NO_2)_4 + 2NO_2 + 6NaCl$$
$$\text{or } K_2PtCl_4 + 4NaNO_2 \rightarrow K_2Pt(NO_2)_4 + 4NaCl \qquad (I)$$

and

$$K_2Pt(NO_2)_4 + 2NH_3 \rightarrow Pt(NO_2)_2(NH_3)_2 + 2KNO_2. \qquad (II)$$

The precipitate is purified by washing with water and recrystallizing from hot water into light yellow needles. On the preparation of a catalyst in accordance with the method of the present invention, the compound is used in the form of a solution or dispersion in an aqueous medium, such as water, aqueous nitric acid or aqueous ammonia. It is believed that dinitrodiamine platinum takes the structure of $[Pt\ NO_2(NH_3)_3]_{NO2}$ instead of $Pt(NO_2)_2(NH_3)_2$ in aqueous ammonia medium and of $Pt(NO_3)_2(NH_3)_2$, $Pt(NO_3)_2$ or $Pt(NO_3)_4$ in aqueous nitric acid medium. Therefore, dinitrodiamine platinum is effective in the preparation of the catalyst of this invention when dissolved in these media. However, since there is a trend that as the strength of nitric acid increases the penetration of platinum into the inside of a support increases, it is preferred for attaining the object of the present invention to use nitric acid in not too high concentration. The dinitrodiamine platinum is supported in an amount, as metal, of 0.01 to 5 g per liter of support, preferably 0.05 to 2 g per liter of support.

The poly(oxyethylene) type nonionic surface active agent used in the method of the present invention should be of an average molecular weight of at least 500, preferably at least 1,000, because those of an average molecular weight of less than 500 are too penetrative to make it difficult to support a catalytic substance in a high concentration only on the surface of a support. Accordingly, as the nonionic surface active agent suitably used are those having relatively low penetration. In particular, average molecular weights of polyethylene glycols, poly(oxyethylene) glycol aryl ethers, poly-(oxyethylene) alkyl, alkyl esters, poly(oxyethylene) alkylamines, poly(oxyethylene) alkyamides, fatty acid esters of poly(oxyethylene) sorbitons and poly(oxyethylene)-poly(oxypropylene) block copolymers are at least 500, preferably at least 1,000 and average molecular weight of poly(oxyethylene) alkyl ethers is at least 500. The aforesaid nonionic surface active agent is used in an amount usually of 0.1 to 50 g, preferably of 0.2 to 20 g per liter of support. In case where a support is impregnated in a catalytic substance solution, the nonionic surface active agent is used in a concentration usually of 0.1 to 10, preferably of 0.02 to 5% by weight of the solution, while, in case where a catalytic substance solution is concentrated and evaporated to dryness on a support, the surface active agent is used in a concentration of 0.01 to 40, preferably of 0.04 to 30% by weight.

Representatives of the poly(oxyethylene) type nonionic surface active agent are: polyethylene glycols $HO(CH_2CH_2O)_nH$ wherein $n = 11 - 90$; poly(oxyethy- lene) glycol alkyl ethers R-O(CH$_2$CH$_2$O)$_n$H wherein R is alkyl groups containing 6 to 30 carbon atoms and $n = 3 - 30$, such as poly(oxyethylene) lauryl ether, poly(oxyethylene) cetyl ether, poly(oxyethylene) stearyl ether and poly(oxyethylene) oleyl ether; poly(oxyethylene) alkylaryl ethers wherein R' is alkyl group containing 6 – 12 carbon atoms and $n = 3 - 30$, such as poly(oxyethylene) octylphenyl ether and poly(oxyethylene) ether; poly(oxyethylene) alkyl esters R—COO(CH$_2$CH$_2$O)$_n$H or R—COO(CH$_2$CH$_2$O)$_{n-1}$—CH$_2$CH$_2$COO—R wherein R is alkyl group containing 6 to 24 carbon atoms and $n = 3$ to 30, such as poly(oxyethylene) glycol monocapronate, poly(oxyethylene) glycol mono-oleate, poly(oxyethylene)- glycol monolaurate, poly(oxyethylene) glycol monostearate, poly(oxyethylene)- glycol dilaurate and poly(oxyethylene)glycol distearate; poly(oxyethylene) alkylamines R-NH(CH$_2$CH$_2$O)$_n$H or wherein R is alkyl group containing 6 to 30 carbon atoms and $n$ and $n' = 3 - 30$, such as poly(oxyethylene) laurylamine, poly(oxyethylene) cetylamine and poly(oxyethylene) stearylamine; poly(oxyethylene)alkylamides R-CONH(CH$_2$CH$_2$O)$_n$H or wherein R is alkyl group containing 6 to 30 carbon atoms and $n$ and $n' = 3 - 30$, such as poly(oxyethylene) laurylamide and poly(oxyethylene) stearylamide; fatty acid esters of poly(oxyethylene)-sorbitan wherein R is alkyl group containing 6 to 24 carbon atoms and $n = 3-30$, such as poly(oxyethylene)sorbitan monolaurate, poly(oxyethylene)sorbitan monostearate and poly(oxyethylene)sorbitan mono-oleate; and poly(oxyethylene)-poly(oxypropylene) co-condensates of Pluronics type HO(CH$_2$CH$_2$O)$_a$(CH$_3$CHCH$_2$O)$_b$(CH$_2$—CH$_2$O)$_c$H wherein $a$, $b$ and $c > 1$ and $(a + b + c) = 20 - 400$ and of Tetronics type wherein $x$ to $x'''$ and $y$ to $y''' > 1$ and $x + x' + x'' + x''' + y + y' + y'' + y''' = 20 - 800$, preferred are those containing major proportion of oxyethylene units.

These nonionic surface active agents, when used together with the dinitrodiamine platinum, very effectively serve in deposition in high concentrations of platinum and other noble metals on to the surface layer of a support, this being the very object of the present invention, and contribute to a large extend to good and uniform contact between a support and a catalytic substance solution during an impregnation step by virtue of their foaming power and, whereby, to uniformization of the supported amount of catalyst composition.

In an embodiment of the method of the present invention, dinitrodiamine platinum and, optionally, other noble metal compounds are dissolved or dispersed in a water, aqueous nitric acid or aqueous ammonia, then added thereto the aforesaid nonionic surface active agent. An inorganic refractory support is then impregnated with or immersed in the liquid thus prepared and the mixture is concentrated to dryness. The so treated support is, after drying, calcined in an oxidative atmosphere, such as air, or reduced in a reductive atmosphere, such as of gaseous hydrogen, to obtain a finished catalyst comprising a platinum containing catalyst composition supported on a porous inorganic refractory support. Alternately, instead of adding the nonionic surface active agent to an aqueous medium containing the dinitrodiamine platinum and, optionally, other noble metal compounds, a support may be treated with an aqueous solution of the nonionic surface active agent and then impregnated with or immersed in the catalytic substance containing aqueous medium. It has been turned out that, when supporting of a catalytic substance is carried out in such a way as mentioned above, the catalyst composition is supported essentially on the external surface of a support to give, after successive treatments, a finished catalyst having an extremely high activity, a high thermal stability and being excellent in practical properties such as supporting strength or attrition resistance.

The inorganic support used in the present invention includes particulated porous refractory materials, such as alumina, silica, silica-alumina, alumina-silica-magnesia, silicon carbide, silica-magnesia, and the like, and may be used in the form of pellets or crumbs of any average diameter usually of 1.5 to 15 mm, preferably of 2 to 8 mm.

The noble metal other than platinum used in the present invention is a metal belonging to the platinum group (Group VIII) in the Periodic Table, such as ruthenium, rhodium, palladium, osmium and iridium, and used in the form of simple substance or compound either alone or in combination with others. Though these raw materials for catalyst are usually used in the form of water-soluble nitrates, such as palladium nitrate; chlorides, such as palladium chloride, ruthenium trichloride or rhodium trichloride; metallic acids, such as hexachloroiridic (IV) acid; and acetates, such as palladium acetate, they may be used in the form of a metallic colloid. That is to say, according to the present invention, even if the platinum is supported with a noble metal other than platinum, a high active catalyst with a small amount of platinum can be obtained by supporting the expensive platinum on the external surface of the support with a high density.

It is believed that the poly(oxyethylene)type nonionic surface active agent aids a catalytic substance to deposit in a high concentration on to the external surface of a support, effects a good contact between the support and a catalytic substance solution to give a finished catalyst of an improved uniformity and enhances the catalytic activity by the subsequent activation.

The support supporting thereon a noble metal or its compound, prepared in the supporting treatment as mentioned above, is dried at 30° to 250°C, preferably at 80°C to 200°C, and then activated. The activation of the catalyst composition may be achieved by calcining it at 300° to 700°C, preferably at 400° to 600°C, in an oxidative atmosphere, e.g. in air, or subjecting it to reduction at 150° to 600°C, preferably at 200° to 550°C, in a reductive atmosphere, e.g. in a stream of gaseous hydrogen or of gaseous hydrogen-nitrogen, to obtain a finished catalyst.

According to the method of the present invention, it is attained to support a catalyst composition in a high density to the external surface of a support to give a catalyst having a high activity, especially an excellent activity at a lower temperature range merely by using the dinitrodiamine platinum as a platinum source together with a small quantity of an inexpensive poly(oxyethylene) type nonionic surface active agent.

Accordingly, the supported catalyst thus obtained can retain its high activity for a long period of time and effectively employed as a catalyst for complete oxidation of carbon monoxide and hydrocarbons contained in internal combustion engine exhaust gases and industrial plant waste gases or as a catalyst for reduction of nitrogen oxides $NO_x$.

As the waste gases exhausted from general industrial plants which may be purified by means of the catalyst of the present invention, there are: waste gases mainly containing organic solvents, such as waste gases from enameled wire-baking furnaces and offset printing processes; noxious and irritating organic compound containing gases, such as formaldehyde containing gases as exhausted from synthetic fiber manufacturing plants, e.g. vinylon manufacturing plant; waste gases exhausted from plants for the preparation of phthalic anhydride, maleic anhydride, acrylic acid, ethylene oxide and like organic compounds by catalytic vapour phase oxidation; and waste gases exhausted from tobacco manufacturing plants.

Especially, these organic solvents are very harmful for human body and apt to explode depending on their concentration, so that they should be removed as possible from the waste gases exhausted from industrial plants. Furthermore, small quantity of organic compounds which are contained in the waste gases exhausted from industrial plants are noxious and have unbearable bad odor even if their contents are several ppm, so they must be removed completely before discharge of the waste gases into air.

EXAMPLE 1

In an evaporating dish there was put 50 cc of an aqueous solution of dinitrodiamine platinum and palladium nitrate containing platinum and palladium in the weight ratio of 5:2 and in the total weight as metals of 0.03 g. The dinitrodiamine platinum was used for the preparation of the Pt-Pd mixed solution in the form of an aqueous solution containing 50 g of platinum as metal and 300 g of free nitric acid per liter. To the solution in the evaporating dish there was added 0.2 g of a high molecular nonionic surface active agent consisting of propylene oxide (PO)-ethylene oxide (EO) block copolymer of an average molecular weight of 8,500 and an ethylene oxide content of 80% by weight, supplied under a trade name Pluronic, and, after dissolving the surface active agent, added thereto 100 cc of an activated alumina in the form of small cylinders of a surface area of 100 m²/g each being of a diameter of 3 mm and of an average length of 5 mm. The solution was, after mixing thoroughly, evaporated to dryness on a water bath. The supported composition thus obtained was dried at 100°C for about 3 hours and then reduced at 400°C for 2 hours in an atmosphere of gaseous hydrogen to obtain a finished catalyst.

EXAMPLE 2

The same procedure as in Example 1 was repeated except that there was used 0.2 g of a Tetronic high molecular weight nonionic surface active agent consisting of a nitrogen-containing PO-EO block copolymer of an EO content of 70% by weight to obtain a finished catalyst.

EXAMPLE 3

The same procedure as in Example 1 was repeated except that there was used as a nonionic surface active agent 0.2 g of poly(oxyethylene) glycol of an average molecular weight of 20,000 to obtain a finished catalyst.

CONTROL 1

The same procedure as in Example 1 was repeated except that there was used no nonionic surface active agent to obtain a finished catalyst.

CONTROL 2

The same procedure as in Example 1 was repeated except that there was used as a platinum compound chloroplatinic acid in place of dinitrodiamine platinum and there was used no nonionic surface active agent to obtain a finished catalyst.

EXAMPLE 4

In an evaporating dish there was put 40 cc of the same dinitrodiamine platinum solution as used in Example 1 containing platinum in the amount as metal of 0.05 g, then dissolved in the solution 0.4 g of a Pluronic type high molecular nonionic surface active agent consisting of a PO-EO block copolymer of an average molecular weight of 10,000 and of an EO content of 70% by weight. The solution was then added with 100 cc of a spherical activated alumina of an average particle size of 3 mm and a surface area of about 140 m²/g and, after well mixed, the mixture was dried and reduced in a reductive atmosphere in the same manner as in Example 1 to obtain a finished catalyst.

EXAMPLE 5

A finished catalyst was prepared by repeating the same procedure as in Example 4 except that there was used as a nonionic surface active agent 0.4 g of a Tetronic type high molecular nonionic surface active agent consisting of a nitrogen-containing PO-EO block copolymer of an average molecular weight of 20,000 and of an EO content of 80% by weight.

EXAMPLE 6

A finished catalyst was prepared in the same procedure as in Example 4 except that there was used as a nonionic surface active agent 0.4 g of poly(oxyethylene) glycol of an average molecular weight of 6,000.

CONTROL 3

A finished catalyst was prepared in the same procedure as in Example 4 except that there was used no nonionic surface active agent.

CONTROL 4

A finished catalyst was prepared in the same procedure as in Example 4 except that there was used as a platinum compound chloroplatinic acid in place of dinitrodiamine platinum and there was used no nonionic surface active agent.

EXAMPLE 7

In an evaporating dish there was put 50 cc of aqueous nitric acid solution of the same dinitrodiamine platinum as used in Example 1 and palladium nitrate containing platinum and palladium in the weight ratio of 2:1 and in the total amount as noble metals of 0.03 g. To the solution was added 0.2 g of a Tetronic type high molecular nonionic surface active agent consisting of a nitrogen-containing PO-EO block copolymer of an average molecular weight of 19,000 and an EO content of 70% by weight and then was added 100 cc of the same activated alumina as used in Example 1. The mixture was concentrate, dried and reduced in a reduction atmosphere in the same manner as in Example 1 to obtain a finished catalyst.

EXAMPLE 8

In an evaporating dish there was put 50 cc of an aqueous solution of the same dinitrodiamine platinum as used in Example 1 and palladium chloride containing platinum and palladium in the weight ratio of 5:2 and in the total amount as noble metals of 0.04 g, then added thereto 0.4 g of a nonionic surface active agent, EMASOL 1130 supplied by Kao-Atlas Co., consisting of a poly(oxyethylene)sorbitan monolaurate of an average molecular weight of 1,100 and containing 17 ethylene oxide units per molecule in average. 100 cc of the same activated alumina as used in Example 1 was then impregnated with the solution and concentrated, dried and reduced in a reductive atmosphere in the same manner as in Example 1 to obtain a finished catalyst.

EXAMPLE 9

In an evaporating dish there was put 40 cc of an aqueous solution of the same dinitrodiamine platinum as used in Example 1 containing 0.07 g as metal of platinum, then added thereto 0.4 g of a poly(oxyethylene) alkyl ether having an average molecularweight of 731 and containing in average 12 ethylene oxide units per molecule. 100 cc of the same activated alumina as used in Example 4 was added to the solution and, after well stirred, subjected to concentration, drying and reduction in the same manner as in Example 1 to obtain a finished catalyst.

EXAMPLE 10

50 cc of an aqueous solution of the same dinitrodiamine platinum as used in Example 1 containing platinum as metal in the amount of 0.07 g was put in an evaporating dish, then dissolved therein 0.2 g of a poly(oxyethylene) nonylphenyl ether of an average molecular weight of 1,800, Nonipol 400 supplied by Sanyo Kasei Co. and added therein 100 cc of the same activated alumina as used in Example 1. The mixture was concentrated, dried and reduced in the same manner as in Example 1 to obtain a finished catalyst.

EXAMPLE 11

A finished catalyst was obtained by repeating the same procedure as in Example 1 except that there was used 50 cc of an aqueuos solution of dinitrodiamine platinum and palladium nitrate containing platinum and palladium in the weight ratio of 1:9 and in the total amount as noble metals of 0.03 g.

CONTROL 5

A finished catalyst was obtained by repeating the same procedure as in Example 11 except that there was used no nonionic surface active agent.

CONTROL 6

A finished catalyst was prepared in the same procedure as in Example 11 except that there was used chloroplatinic acid as a platinum compound in place of dinitrodiamine platinum and used no nonionic surface active agent.

EXAMPLE 12

A finished catalyst was obtained by repeating the same procedure as in Example 4 except that there was used 40 cc of an ammoniacal aqueous solution dinitrodiame platinum containing 0.05 g as metal of platinum. The ammoniacal solution used was prepared from a stock solution prepared by dissolving dinitrodiamine platinum in the amount containing as metal 50 g of platinum and 4.35 g of ammonia in water to form 1 liter of aqueous solution.

EXAMPLE 13

In a beaker there was charged 1,400 cc of the same dinitrodiamine platinum solution as used in Example 1 containing 0.42 g as metal of platinum, then dissolved therein 14 g of a high molecular nonionic surface active agent consisting of a Pluronic type PO-EO block copolymer of an average molecular weight of 11,000 and an EO content of 80% by weight. In the solution was then dipped 200 cc of the same activated alumina as used in Example 4. The activated alumina was, after 50 minutes, taken out of the solution, dried at 100°C for 3 hours an calcined at 500°C in air for 3 hours to obtain a finished catalyst containing in total 0.2 g of platinum as metal.

CONTROL 7

The same procedure as in Example 13 was repeated except that there was used as a platinum source chloroplatinic acid in place of dinitrodiamine platinum and used no nonionic surface active agent. In this case, there was obtained a finished catalyst containing 0.22 g as metal of platinum.

EXAMPLE 14

The finished catalysts obtained in Examples 1 to 12 and Controls 1 to 6 were subjected to the following initial activity test. Each 10 cc of the catalysts was packed in separate stainless steel reaction tube of an inner diameter of 18 mm. A mixed gas consisting of 1% by volume of carbon monoxide(CO), 500 ppm of propylene, 5% by volume of oxygen, 10% by weight volume of steam and the balance of nitrogen was introduced, at temperatures on the entrance of the reaction tube as indicated in the following Table 1, into the reaction tube at a space velocity of 15,000 hr$^{-1}$ for 5 to 15 minutes until the system reached a stationary state at measuring temperatures and then, the effluent gas was subjected to measurements of CO by means of a non-dispersive infrared gas analyser (NDIR method), of propylene by means of a flame ionization detector gas analyser (FID method).

Heat treatment conditions of the catalysts were to maintain each catalyst at a temperature of 980°C for 24 hours, and then the catalysts were subjected to the activity test.

The results obtained were as summarized in the following Table 1, wherein each numeral indicating a per cent conversion (a purification rate) of hydrocarbon (HC) or carbon monoxide (CO).

The above Table 1 indicates that all the fresh catalysts in accordance with the present invention are superior to the catalysts of Controls in its low temperature activity.

EXAMPLE 15

The activities and stabilities of the catalysts prepared in Examples 1 to 12 and Controls 1 to 6 were evaluated by the following tests using an exhaust gas from an automobile engine. Each 15 cc of the catalysts was packed in separate stainless steel reaction tube of an inner diameter of 30 mm and an exhaust gas from a commercially available four-cylindered gasoline engine of a displacement of 1,600 cc, operated at 1,900 r.p.m. under a boost pressure of 420 mm Hg on a lead-free gasoline, was passed therethrough for purification test. Portion of the exhaust gas and a necessary amount of secondary air were mixed together and passed through the reaction tube at a rate of 15 liters/minute at an ambient temperature for 100 hours. During the run, hydrocarbons, carbon monoxide and oxygen contained in the effluent were measured by means of a MEXA-18 type analyser manufactured by KABUSHIKI KAISHA HORIBA SEISAKUSHO, Japan. The composition of the diluted exhaust gas on the entrance of the reaction tube was: carbon monoxide 0.5% by volume; total hydrocarbons (calculated as methane) 1,800 ppm; oxygen 5 to 6% by volume; and the balance being carbon dioxide, nitrogen, water and other impurities. The catalyst temperature was of 460° to 490°C. The results obtained were as summarized in the following Table 2.

Table 1

| Example Nos. of catalyst | catalyst | 170°C* CO | 170°C* HC | 200°C CO | 200°C HC | 210°C CO | 210°C HC | 225°C CO | 225°C HC | 250°C CO | 250°C HC | 300°C CO | 300°C HC |
|---|---|---|---|---|---|---|---|---|---|---|---|---|---|
| Example 1 | fresh | 99 | 94 | 100 | 99 | 100 | 99 | 100 | 99 | 100 | 99 | — | — |
|  | after heat treatment | — | — | 0 | 0 | 3 | 1 | 7 | 2 | 100 | 99 | — | — |
| Example 2 | fresh | 98 | 92 | 100 | 99 | 100 | 99 | 100 | 99 | 100 | 99 | — | — |
|  | after heat treatment | — | — | 0 | 0 | 6 | 2 | 8 | 3 | 100 | 99 | — | — |
| Example 3 | fresh | 94 | 85 | 100 | 98 | 100 | 99 | 100 | 99 | 100 | 99 | — | — |
|  | after heat treatment | — | — | 0 | 0 | 5 | 1 | 8 | 2 | 100 | 99 | — | — |
| Control 1 | fresh | 13 | 3 | 100 | 93 | 100 | 95 | 100 | 98 | 100 | 98 | — | — |
|  | after heat treatment | — | — | 0 | 0 | 6 | 2 | 6 | 2 | 100 | 98 | — | — |
| Control 2 | fresh | 0 | 0 | 10 | 2 | 46 | 18 | 75 | 60 | 100 | 96 | — | — |
|  | after heat treatment | — | — | 0 | 0 | 3 | 3 | 3 | 3 | 28 | 6 | 100 | 97 |
| Example 4 | fresh | 94 | 83 | 100 | 98 | 100 | 99 | 100 | 99 | 100 | 99 | — | — |
|  | after heat treatment | — | — | 0 | 0 | 2 | 1 | 6 | 1 | 15 | 4 | 100 | 99 |
| Example 5 | fresh | 91 | 80 | 100 | 97 | 100 | 99 | 100 | 99 | 100 | 99 | — | — |
|  | after heat treatment | — | — | 0 | 0 | 3 | 1 | 5 | 1 | 13 | 4 | 100 | 99 |
| Example 6 | fresh | 95 | 88 | 100 | 98 | 100 | 99 | 100 | 99 | 100 | 99 | — | — |
|  | after heat treatment | — | — | 0 | 0 | 2 | 1 | 3 | 1 | 13 | 2 | 100 | 98 |
| Control 3 | fresh | 11 | 0 | 100 | 96 | 100 | 96 | 100 | 97 | 100 | 98 | — | — |
|  | after heat treatment | — | — | 0 | 0 | 3 | 1 | 3 | 1 | 13 | 2 | 100 | 95 |
| Control 4 | fresh | 0 | 0 | 71 | 53 | 88 | 78 | 100 | 93 | 100 | 96 | — | — |
|  | after heat treatment | — | — | 0 | 0 | 2 | 1 | 2 | 1 | 13 | 2 | 100 | 88 |
| Example 7 | fresh | 96 | 88 | 100 | 97 | 100 | 99 | 100 | 99 | 100 | 99 | — | — |
|  | after heat treatment | — | — | 0 | 0 | 5 | 1 | 10 | 3 | 100 | 99 | — | — |
| Example 8 | fresh | 99 | 95 | 100 | 99 | 100 | 99 | 100 | 99 | 100 | 99 | — | — |
|  | after heat treatment | — | — | 0 | 0 | 4 | 0 | 10 | 3 | 100 | 99 | — | — |
| Example 9 | fresh | 97 | 90 | 100 | 99 | 100 | 99 | 100 | 99 | 100 | 99 | — | — |
|  | after heat treatment | — | — | 0 | 0 | 3 | 1 | 6 | 1 | 18 | 4 | 100 | 99 |
| Example 10 | fresh | 88 | 80 | 100 | 97 | 100 | 99 | 100 | 99 | 100 | 99 | — | — |
|  | after heat treatment | — | — | 0 | 0 | 2 | 1 | 4 | 1 | 13 | 3 | 100 | 99 |
| Example 11 | fresh | 34 | 0 | 100 | 99 | 100 | 99 | 100 | 99 | 100 | 99 | — | — |
|  | after heat treatment | — | — | 0 | 0 | 13 | 0 | 64 | 42 | 100 | 99 | — | — |
| Control 5 | fresh | 0 | 0 | 100 | 95 | 100 | 99 | 100 | 99 | 100 | 99 | — | — |
|  | after heat treatment | — | — | 0 | 0 | 7 | 0 | 53 | 37 | 100 | 98 | — | — |
| Control 6 | fresh | 0 | 0 | 19 | 0 | 19 | 0 | 98 | 91 | 100 | 98 | — | — |
|  | after heat treatment | — | — | 0 | 0 | 6 | 0 | 30 | 6 | 100 | 98 | — | — |
| Example 12 | fresh | 73 | 54 | 100 | 97 | 100 | 99 | 100 | 99 | 100 | 99 | — | — |
|  | after heat treatment | — | — | 0 | 0 | 1 | 0 | 5 | 1 | 24 | 7 | 100 | 99 |

*In the Controls, the activities were measured at a temperature of 180°C instead of 170°C.

Table 2

| Example Nos. of catalyst | at starting CO | at starting HC | 10 hrs CO | 10 hrs HC | 25 hrs CO | 25 hrs HC | 50 hrs. CO | 50 hrs. HC | 100 hrs CO | 100 hrs HC | emission concentration 100 hrs CO(%) | emission concentration 100 hrs HC(ppm) |
|---|---|---|---|---|---|---|---|---|---|---|---|---|
| Example 1 | 98 | 90 | 98 | 90 | 98 | 90 | 98 | 89 | 98 | 89 | 0.01 | 198 |
| Example 2 | 98 | 89 | 98 | 89 | 98 | 90 | 98 | 90 | 98 | 89 | 0.01 | 198 |
| Example 3 | 98 | 89 | 99 | 90 | 98 | 90 | 98 | 90 | 98 | 89 | 0.01 | 198 |
| Control 1 | 96 | 86 | 95 | 84 | 94 | 84 | 94 | 84 | 94 | 84 | 0.03 | 288 |
| Control 2 | 92 | 84 | 91 | 82 | 92 | 82 | 91 | 81 | 92 | 81 | 0.04 | 342 |
| Example 4 | 98 | 88 | 98 | 90 | 98 | 91 | 98 | 91 | 98 | 90 | 0.01 | 180 |
| Example 5 | 96 | 91 | 98 | 90 | 98 | 90 | 98 | 89 | 97 | 89 | 0.015 | 198 |
| Example 6 | 97 | 89 | 98 | 90 | 96 | 90 | 97 | 90 | 97 | 90 | 0.015 | 180 |
| Control 3 | 96 | 86 | 96 | 88 | 96 | 87 | 95 | 85 | 95 | 85 | 0.025 | 270 |
| Control 4 | 92 | 82 | 93 | 80 | 92 | 80 | 92 | 80 | 91 | 80 | 0.045 | 360 |
| Example 7 | 98 | 89 | 98 | 90 | 98 | 90 | 98 | 90 | 98 | 89 | 0.01 | 198 |
| Example 8 | 99 | 91 | 99 | 90 | 98 | 90 | 98 | 90 | 98 | 90 | 0.01 | 180 |
| Example 9 | 99 | 92 | 99 | 91 | 99 | 91 | 99 | 91 | 99 | 90 | 0.005 | 180 |
| Example 10 | 98 | 91 | 98 | 91 | 99 | 91 | 98 | 90 | 98 | 90 | 0.01 | 180 |
| Example 11 | 97 | 88 | 96 | 87 | 95 | 86 | 96 | 87 | 95 | 85 | 0.025 | 270 |
| Control 5 | 96 | 85 | 95 | 84 | 95 | 83 | 94 | 83 | 93 | 83 | 0.035 | 306 |
| Control 6 | 94 | 82 | 94 | 80 | 93 | 80 | 92 | 80 | 92 | 79 | 0.040 | 378 |
| Example 12 | 97 | 87 | 98 | 89 | 98 | 89 | 99 | 89 | 98 | 89 | 0.01 | 198 |

The results summarized in the above Table 2 indicates that the catalysts in accordance with the present invention exhibited superior activity, especially HC purification activity and stability compared with that of the Controls.

EXAMPLE 16

The catalysts obtained in Example 13 and Control 7 were subjected to low temperature initial activity tests in the following manner:

Each 20 cc of the catalysts were packed in separate stainless steel reaction tubes of an inner diameter of 25 mm. A gaseous mixture consisting of 1% of carbon monoxide, 1,000 ppm of propylene and the balance of air was introduced at a gas temperature on the entrance of the reaction tube of 160°, 170° or 180°C at a space velocity of 20,000 hr$^{-1}$ and, after the system reached the stationary state at the prescribed temperatures, the effluent from the reaction tube was analysed by means of a gas chromatography manufactured by Kabushiki Kaisha Shimazu Seisakusho, Japan. The CO concentration was determined at a column temperature of 96°C using a molecular sieve and the propylene concentration was determined at a column temperature of 100°C using 15% dioctyl sebacate + 15% behenic acid on a camerite CK carrier of 80 to 100 mesh to obtain the results as summarized in the Table 3 in which numeral values indicating the conversions of CO and propylene (HC).

Table 3

| Example Nos. of catalyst | 160°C CO | 160°C HC | 170°C CO | 170°C HC | 180°C CO | 180°C HC |
|---|---|---|---|---|---|---|
| Example 13 | 98 | 95 | 99,5 | 99 | 100 | 99.9 |
| Control 7 | 10 | 5 | 30 | 7 | 88 | 91 |

The above Table 3 indicates that the catalyst of the present invention is superior in its low temperature activity.

EXAMPLE 17

The catalysts obtained in Example 13 and Control 7 were subjected to activity tests in a waste gas converter in a phthalic anhydride manufacturing plant. For the test, 130 cc of the catalyst was packed in a stainless steel reaction tube of an inner diameter of 53 mm and heated to a prescribed temperature by means of an electric heater, then passed therethrough a waste gas at a space velocity of 35,000 hr$^{-1}$ while judging the activity by sniffing the effluent from the reaction tube. In case of the catalyst of the present invention the effluent became odorless at a gas temperature on the entrance of the reaction tube of 220°C, while, on the other hand, in case of the catalyst of Control 7 the odor of the effluent became insensible at a gas temperature of 250°C.

EXAMPLE 18

Figure 1:
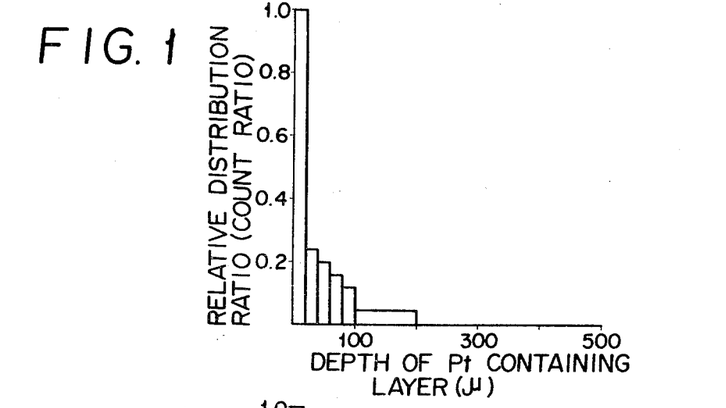
FIG. 1 is a graph indicating the relative distribution ratio of platinum in a catalyst prepared by the method of the present invention.
Figure 2:
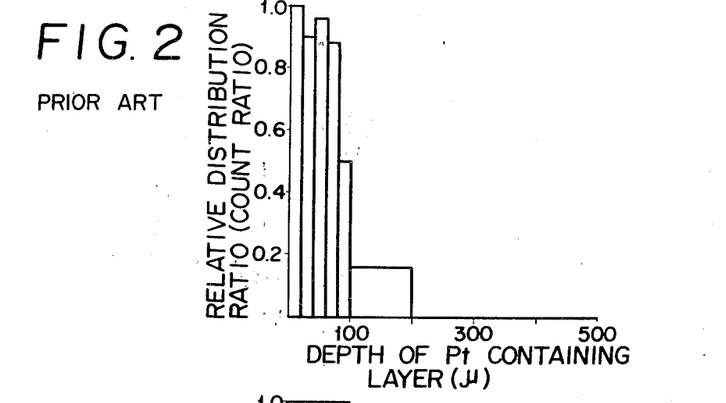
FIG. 2 is a graph indicating the relative distribution ratio of platinum in a catalyst prepared by using dinitrodiamine platinum and without using any additive.
Figure 3:
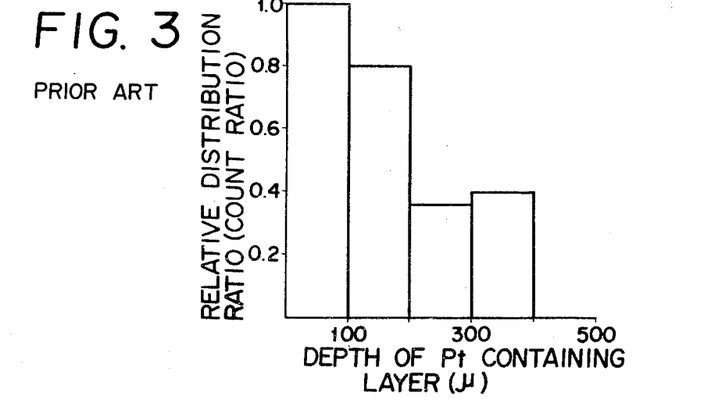
FIG. 3 is a graph indicating the relative distribution ratio of platinum in a catalyst prepared by using chloroplatinic acid instead of dinitrodiamine platinum and without using any additive.

On the catalysts obtained in Example 4 and Controls 3 and 4, the superficial deposition ratios of catalyst composition were determined by measuring the distribution of the catalyst composition from the surface to inside of the supported catalyst by means of a X-ray microanalyser made by Nippon Denshi Co., Ltd. to obtain the results as shown in FIGS. 1 to 3 in the accompanying drawings.

FIGS. 1 to 3 definitely show that in the catalyst of the present invention (FIG. 1) a catalytically active substance is supported in a very high density in the surface layer of a support compared with the catalyst of Control 3 (FIG. 2) and of Control 4 FIG. 3).

Figure 4:
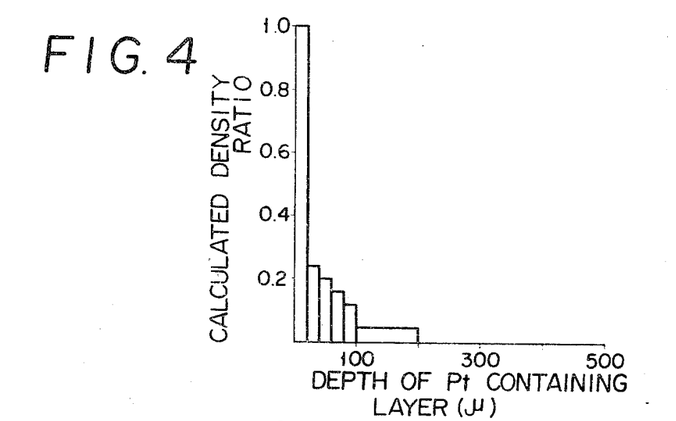
FIG. 4 is a graph indicating the relative density distribution ratio of platinum by calculation in a catalyst of FIG. 1 in the same supported amount based on FIG. 1.
Figure 5:
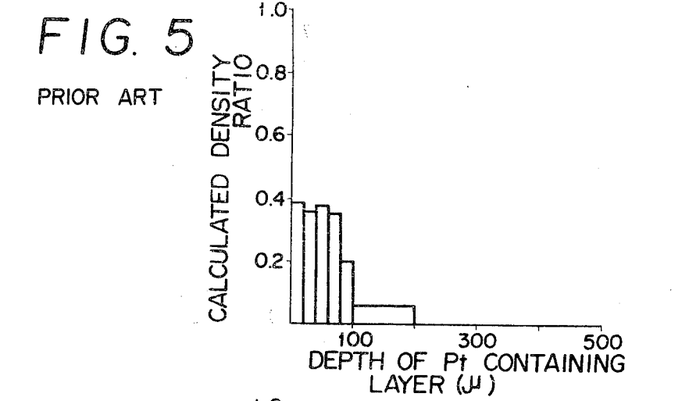
FIG. 5 is a graph indicating the relative density distribution ratio of platinum by calculation in a catalyst of FIG. 2 in the same supported amount based on FIG. 1.
Figure 6:
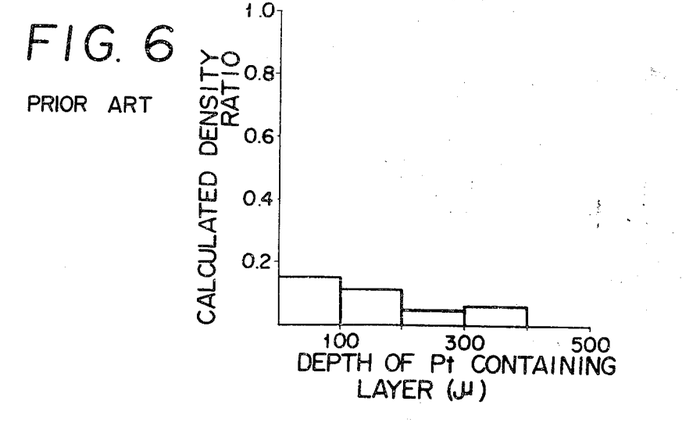
FIG. 6 is a graph indicating the relative density distribution ratio of platinum by calculation in a catalyst of FIG. 3 in the same supported amount based on FIG. 1.

Furthermore, on these catalysts, the relative density distribution ratios of platinum were calculated on the assumption that the supported amounts of active substances in the three catalysts were identical on the basis of the supported amount in the catalyst of Example 4 to obtain the results as shown in FIGS. 4 to 6. FIGS. 4 to 6 also definitely show that, in the case of the same supported amount, a catalytically active substance is supported in a very high density in the surface layer of a support in the catalyst of the present invention (FIG. 4) compared with those in the catalyst of Control 3 (FIG. 5) and of Control 4 (FIG. 6).

What is claimed is:

1. A method for the production of a platinum catalyst used for purification of exhaust and waste gases comprising depositing platinum on to a porous inorganic refractory support by impregnating said support with an aqueous medium consisting of dinitrodiamine platinum in the presence of at least one poly (oxyethylene) type nonionic surface active agent of an average molecular weight of at least 500, selected from the group consisting of poly(oxyethylene) glycols, poly(oxyethylene) alkyl ethers, poly(oxyethylene) alkylaryl ethers, poly(oxyethylene)-alkyl esters, poly(oxyethylene) alkylamines, poly(oxyethylene)-alkylamides, fatty acid esters of poly(oxyethylene)sorbitanes and poly(oxyethylene)-poly(oxypropylene) block copolymers, drying the resulting impregnated support and subjecting it to calcination or reduction.

2. A method of claim 1 in which the aqueous medium containing dinitrodiamine platinum is a member selected from the group consisting of solutions of dinitrodiamine platinum in water, aqueous nitric acid and aqueous ammonia.

3. A method of claim 2 in which the aqueous medium containing dinitrodiamine platinum is an aqueous nitric acid solution of dinitrodiamine platinum.

4. A method of claim 1 in which the nonionic surface active agent is used in the amount of 0.1 to 50 g per liter of the support.

5. A method of claim 1 in which the dinitrodiamine platinum is supported in the amount as metal of 0.01 to 5 g per liter of the support.

6. A method of claim 1 in which the dinitrodiame platinum is supported in the amount as metal of 0.05 to 2 g per liter of the support.

7. The method of claim 1 in which the aqueous medium contains the dinitrodiamine platinum and another Group VIII noble metal or its compound in the form selected from the group consisting of a Group VIII noble metallic colloid, a Group VIII noble metal salt and a Group VIII noble metal acid.

8. A method of claim 7 in which the other noble metal is palladium.

9. A method of claim 4 in which the poly(oxyethylene) type nonionic surface active agent is of the general formula $$HO(CH_2CH_2O)_a(CH_3CHCH_2O)_b(CH_2CH_2O)_cH$$

where, in the formula, $a, b$ and $c$ are greater than 1 and $(a+b+c)$ is from 20 to 400, and of an average molecular weight of at least 1,000.

10. A method of claim 4 in which the nonionic surface active agent of poly(oxyethylene) type is a polyethylene glycol of an average molecular weight of at least 1,000.

11. A method of claim 4 in which the nonionic surface active agent of poly(oxyethylene) type is a fatty acid ester of a poly(oxyethylene)sorbitan of an average molecular weight of at least 1,000.

12. A method of claim 4 in which the nonionic surface active agent of poly(oxyethylene) type is a poly(oxyethylene) alkyl ether of an average molecular weight of at least 500.

13. A method of claim 4 in which the nonionic surface active agent of poly(oxyethylene) type is a poly(oxyethylene) alkylaryl ether of average molecular weight of at least 1,000.

14. A method of claim 1 in which the calcination is carried out at a temperature of 300° to 700°C in an oxidative atmosphere.

15. A method of claim 1 in which the reduction is carried out at a temperature of 150° to 600°C in a reductive atmosphere.

16. A method of claim 4 in which the nonionic surface active agent of poly(oxytheylene) type is of an average molecular weight of at least 1,000 and of the general formula where, in the formula, $x, x', x'', x''', y, y', y''$ and $y'''$ are greater than 1 and $(x+x'+x''+x'''+y+y'+y''+y''')$ is from 20 to 800.

17. A method for the production of a platinum catalyst used for purification of exhaust and waste gases comprising depositing platinum on to a porous inorganic refractory support by impregnating said support with an aqueous nitric acid solution consisting of dinitrodiamine platinum in the presence of at least one poly(oxyethylene) type nonionic surface active agent of an average molecular weight of at least 500 selected from the group consisting of polyethylene glycols, poly(oxyethylene) alkyl ethers, poly(oxyethylene) alkylaryl ethers, poly(oxyethylene) alkyl esters, poly(oxyethylene) alkylamines, poly(oxyethylene)alkylamides, fatty acid esters of poly(oxyethylene)sorbitanes and poly(oxyethylene)-poly(oxypropylene) block copolymers in an amount of 0.1 to 50 g per liter of the support, drying the resulting impregnated support and subjecting it to calcination or reduction.

* * * * *

UNITED STATES PATENT OFFICE
CERTIFICATE OF CORRECTION

Patent No. 3,953,369          Dated August 23, 1976

Inventor(s) Takashi OHARA et al

It is certified that error appears in the above-identified patent and that said Letters Patent are hereby corrected as shown below:

Column 3, line 6: change "dinitroditiamine" to -- dinitrodiamine --.

Column 4, line 24: change "$PtNO_2(NH_3)_3 NO2$" to -- $PtNO_2(NH_3)_3NO_2$ --.

Column 4, line 49: change "poly-(oxyethylene) alkyl" to -- poly-(oxyethylene) alkyl ethers --.

Column 4, line 51: change "sorbitons" to -- sorbitans --.

Column 4, line 60: change "0.1 to 10" to -- 0.01 to 10 --

Column 5, line 25: change "poly(oxyethylene) ether" to -- poly(oxyethylene) nonyl phenyl ether --.

Signed and Sealed this

Ninth Day of November 1976

[SEAL]

Attest:

RUTH C. MASON
Attesting Officer

C. MARSHALL DANN
Commissioner of Patents and Trademarks